(12) United States Patent
Brown et al.

(10) Patent No.: US 10,104,897 B2
(45) Date of Patent: Oct. 23, 2018

(54) SYSTEMS AND METHODS FOR MAKING SPENT GRAIN DOUGH PRODUCTS

(71) Applicants: Thomas Brown, Louisville, KY (US); Mark Allgeier, Louisville, KY (US)

(72) Inventors: Thomas Brown, Louisville, KY (US); Mark Allgeier, Louisville, KY (US)

(*) Notice: Subject to any disclaimer, the term of this patent is extended or adjusted under 35 U.S.C. 154(b) by 580 days.

(21) Appl. No.: 14/142,359

(22) Filed: Dec. 27, 2013

(65) Prior Publication Data

US 2014/0234489 A1    Aug. 21, 2014

Related U.S. Application Data

(60) Provisional application No. 61/746,996, filed on Dec. 28, 2012.

(51) Int. Cl.

| | |
|---|---|
| *A21D 8/02* | (2006.01) |
| *A21D 6/00* | (2006.01) |
| *B09B 3/00* | (2006.01) |
| *B09B 5/00* | (2006.01) |
| *A21D 2/36* | (2006.01) |
| *A21D 10/02* | (2006.01) |
| *A21D 13/41* | (2017.01) |

(52) U.S. Cl.
CPC ............... *A21D 8/02* (2013.01); *A21D 2/368* (2013.01); *A21D 6/001* (2013.01); *A21D 6/003* (2013.01); *A21D 10/025* (2013.01); *A21D 13/41* (2017.01); *B09B 3/0083* (2013.01); *B09B 5/00* (2013.01); *F26B 2200/06* (2013.01)

(58) Field of Classification Search
CPC .. A21D 2/368; A21D 2/36; A23L 1/10; A23B 9/04; A23B 9/00
See application file for complete search history.

(56) References Cited

U.S. PATENT DOCUMENTS

| | | | | |
|---|---|---|---|---|
| 2,162,973 | A | * | 6/1939 | Roland ........................... 34/134 |
| 2,263,608 | A | | 11/1941 | Brown |
| 2,754,211 | A | | 7/1956 | Siefker et al. |
| 3,212,902 | A | | 10/1965 | Bavisotto |
| 3,615,665 | A | | 10/1971 | Olson et al. |
| 3,721,568 | A | | 3/1973 | Wilson |
| 3,845,219 | A | * | 10/1974 | Federico ........................... 26/19 |

(Continued)

FOREIGN PATENT DOCUMENTS

| | | |
|---|---|---|
| EP | 0852911 A2 | 7/1998 |
| WO | 2011/124678 A1 | 10/2011 |

OTHER PUBLICATIONS

Eidet I E et al.: "Making Quick Breads with Barley Distillers Dried Grain Flour", Baker's Digest, Siebel Publishing Co., Pontiac, IL, US, vol. 58, No. 5, Sep. 11, 1984, pp. 14-17, XP001161040, ISSN: 0191-6114.

*Primary Examiner* — Felicia C Turner
(74) *Attorney, Agent, or Firm* — Duncan Galloway Egan Greenwald, PLLC; Kevin T. Duncan (57) ABSTRACT

The invention provides methods for the production of dough and bread products made at least in part of spent brewer's grain. The spent grain is removed from a brewing or distilling process, dried, frozen, and then further processed into a spent grain dough product. More specifically, the invention relates to the systems and methods for making frozen pizza dough balls composed at least in part of grain products that have been used in the process of brewing beer or distilling sprits such as whiskey.

17 Claims, 10 Drawing Sheets

(56) References Cited

U.S. PATENT DOCUMENTS

| | | | |
|---|---|---|---|
| 4,377,601 A | * | 3/1983 | Dreese et al. .............. 426/472 |
| 4,606,923 A | | 8/1986 | Ricke |
| 4,617,270 A | | 10/1986 | Anderson et al. |
| 4,632,833 A | * | 12/1986 | Gannon ..................... 426/242 |
| 4,828,846 A | | 5/1989 | Rasco et al. |
| 5,225,228 A | | 7/1993 | Reddy et al. |
| 5,260,092 A | | 11/1993 | Gannon |
| 5,637,336 A | | 6/1997 | Kannenberg et al. |
| 5,939,123 A | * | 8/1999 | Welles ..................... A23L 1/182 |
| | | | 426/455 |
| 6,167,636 B1 | | 1/2001 | Kepplinger et al. |
| 6,365,210 B1 | | 4/2002 | Schaible, II et al. |
| 6,616,953 B2 | | 9/2003 | Fidler et al. |
| 7,252,850 B2 | | 8/2007 | Levin et al. |
| 7,309,602 B2 | | 12/2007 | David |
| 7,727,395 B2 | | 6/2010 | Fitch et al. |
| 8,133,527 B2 | | 3/2012 | Haynes et al. |
| 8,173,193 B2 | | 5/2012 | Haynes et al. |
| 2009/0211570 A1 | | 8/2009 | Haynes et al. |
| 2012/0005916 A1 | | 1/2012 | Lopez et al. |

\* cited by examiner

SYSTEMS AND METHODS FOR MAKING SPENT GRAIN DOUGH PRODUCTS

CROSS-REFERENCE TO RELATED PATENT APPLICATIONS

This patent application claims priority to U.S. Provisional Patent Application No. 61/746,996, filed Dec. 28, 2012, entitled "SYSTEMS AND METHODS FOR MAKING SPENT GRAIN DOUGH PRODUCTS," which application is hereby incorporated by reference herein in the entirety.

FIELD OF INVENTION

This invention generally relates to dough and bread products made at least in part of spent brewer's grain. More specifically, the invention relates to the systems and methods for making frozen pizza dough balls composed at least in part of spent grain products that have been used in the process of brewing beer or distilling sprits such as whiskey.

BACKGROUND OF THE INVENTION

When either brewing or distilling alcohol such as beer or whiskey, grains such as wheat or barley are commonly used. In the brewing process, these grains are stripped of their sugars leaving a high protein, high fiber grain mash. This grain mash is commonly referred to as "spent grain" or "brewer's grain".

The distillation process produces spent grain through a series of steps beginning with malting. If the distillation process uses barley as the base grain, the process of malting converts plain barley grain into malted barley. The barley is first soaked for between 48 and 72 hours in tanks or steeps and allowed to germinate. The temperature of the germinating barley is carefully controlled, and then the malted barley is spread out and allowed to drain and cool.

The fully germinated malt is next transferred to a malt kiln for drying on a mesh screen over a fire. The malt kiln draws hot air from a furnace through the mesh and malt by way of a chimney effect. The malt is dried and roasted in the kiln at 60° C. for two days and is then ready for the next stage in the distilling process. A method of performing this process is described in Kannenberg et al. U.S. Pat. No. 5,637,336, "PROCESS FOR DRYING MALT".

The malt contains much detritus or combings, principally rootlets. These are normally removed from the malt and stored for later disposal. The malt is then coarsely ground and becomes known as malt grist. The malt grist is fed into a mash tun where it is combined with a carefully measured quantity of hot water. This completes the conversion of dextrin into maltose and produces a fermentable solution of the malt sugars called wort or worts. Again, after several washings to draw out the malt, the solid residue or draff is removed stored for later disposal. Both the combings and the draff that were removed in this portion of the distilling process are spent grain.

Spent grain is produced in a similar manner in the brewing process. The brewing process is typically divided into several steps; the steps that produce spent grain are mashing and lautering.

Mashing is the process of combining a mix of milled grain, known as the grist (typically malted barley) with water and heating this mixture up to allow enzymes in the malt to break down the starch in the grain into sugars. Sugars created in the mashing process will eventually be the food for the yeast in the fermentation process. Mashing removes most of the proteins, starches and sugars from the grain, leaving behind what is known as spent grain.

Lautering is the process of separating the wort (liquid) from the spent grain. It can be carried out in a mash tun outfitted with a false bottom, a lauter tun, a special-purpose wide vessel with a false bottom and rotating cutters to facilitate flow, a mash filter, or a plate-and-frame filter designed for this kind of separation. Most separation processes have two stages: first wort run-off, during which the extract is separated in an undiluted state from the spent grains; and sparging, in which the extract which remains with the grains is rinsed off with hot water. The spent grain is then typically removed from the process for later disposal.

Whether the spent grain was produced in either a distilling or a brewing process changes little about the grain itself other than determining the flavor and color of the spent grain. Once the spent grain has been removed from either the brewing or distilling process, it is typically considered a waste product. Most producers of alcohol typically with either give the spent grain away for free, or pay to have it disposed of. Larger brewing or distilling operations may have processes in place to process the spent grain such that it can be sold as animal feed. These processes typically include drying the spent grain and then storing it in either open containers or temporary grain silos.

Known processes for drying spent grain include Kepplinger et al. U.S. Pat. No. 6,167,636 "PROCESS FOR THERMALLY UTILIZING SPENT GRAINS". The process described in Kepplinger et al. is a common process whereby spent grain is tumbled dry in a kiln or furnace type convection dryer that utilizes a natural gas burner as a heat source. However, Kepplinger et al. and other similar methods still view the spent grain as a waste product, in Kepplinger's case, to be burned as a fuel source. Larger breweries and distilleries may already have methods, such as convection tumble drying, in place to dry spent grain so that it can be commoditized and sold as either a fuel source or as animal feed. In this process, rapidly cooling the spent grain prior to drying is not a concern and is not disclosed.

If spent grain is to be used as animal feed it must be at least partially dried. The spent grain may be dried as described above, or may be dried in a mechanical process, such as by a screw press. With either method, there are no requirements for how the grain is handled both before and after the drying process as the regulations for handling the spent grain for animal feed purposes are not very stringent.

It is therefore well known in the art to dry and utilize the spent grain produced in brewing and distilling for fuel or as animal feed. However, the methods commonly employed to prepare the grain would not be either economical or practical for smaller breweries or distilleries. These smaller operations still produce spent grain as a byproduct of alcohol production and have a need for the spent grain to be taken away or disposed of. It is the aim of the present invention to satisfy this need and to provide a system and method for drying, storing, and processing the spent grain into a human consumable product.

SUMMARY OF THE INVENTION

The present invention provides systems and methods for producing spent grain dough products. The term "spent grain" encompasses a range of grains and cereals that are byproducts of the brewing and distilling processes and includes wheat, barley, rye, corn, millet, and sorghum. More specifically, the present invention encompasses grains that have been used in the brewing or distillation of alcohol. In either the brewing or distillation process, the grains are stripped of their sugars, and the spent grains that remain after the malting process are rich in protein and fiber. The spent grains are generally considered a waste product of the brewing or distillation process, and are commonly disposed of, or in some instances, converted into an animal feed product. The present invention provides systems and methods for the utilization of spent grain as a component of human food products, specifically, bread dough.

The addition of spent brewer's grains to a dough product not only utilizes what is normally considered to be a waste product, but also enriches the dough product with a high fiber and protein content.

In one aspect, the invention provides a method of processing spent grain into frozen dough balls. In the brewing process, lautering is the process of separating the wort (liquid) from the spent or residual grain and typically consists of three primary steps: mashout, recirculation, and sparging. In the mashout process the temperature of the mash is raised, typically, to about 170 degrees F. The spent grain used in the malting process is first separated from the liquid (wort) to be fermented into alcohol. In conjunction with the sparging process, in which the extract which remains with the grains is rinsed off with hot water, the grains may also be rinsed a second time with cool or cold water to rapidly cool the spent grain. This process of rapidly cooling the spent grain is performed in the same mash tun where the sparging process is performed. The rinsing of the spent grains with cool or cold water is performed before the spent grains are extracted from the mash tun, but after the sparging process has extracted the wort from the spent grain. The energy cost of cooling the spent grain in this manner is minimal and does not dilute the taste of the spent grain. The spent grain is then stored in sealed containers and moved from the brewery or distillery to a separate location. The spent grain is then transferred into containers where it can be drained and cooled to temperatures required by food safety guidelines. The cooled and drained spent grain is then put in a new container where it is frozen, giving the grain an extended shelf life. The frozen grain is then transported to a production facility where it is combined with other ingredients including flour, yeast, sugar, and water to produce a dough mixture. The dough mixture is then formed into balls, flash frozen, and packaged for distribution.

In another aspect, the invention provides a different embodiment of a method for processing spent grain into frozen dough products. The spent grain used in the malting process is first separated from the liquid to be fermented into alcohol. The spent grain is then stored in sealed false bottom containers and immediately stored in a refrigeration unit to simultaneously cool and drain. The false bottoms containing the solvents drained from the spent grain are then removed, and the containers are re-sealed. The spent grain is then frozen in the same containers used to drain and cool the spent grain The frozen spent grain is then transported to a production facility where it is combined with other ingredients including flour, yeast, sugar, and water to produce a dough mixture. The dough mixture is then formed into balls, flash frozen, and packaged for distribution.

In yet another aspect, the invention provides a different embodiment of a method for processing spent grain into frozen dough products. The spent grain used in the malting process is first separated from the liquid to be fermented into alcohol. The spent grain is then moved to transportation containers that allow for the spent grain to be cooled while being transported. The cooled spent grain is then transferred into separate containers where it can be drained and further cooled. The cooled and drained spent grain is then put in a new container where it is frozen, giving the grain an extended shelf life. The frozen grain is then transported to a production facility where it is combined with other ingredients including flour, yeast, sugar, and water to produce a dough mixture. The dough mixture is then formed into balls, flash frozen, and packaged for distribution.

In yet another aspect, the invention provides the invention provides a different embodiment of a method for processing spent grain into frozen dough products as described above wherein the dough products comprise dough sheets.

In yet another aspect, the invention provides the invention provides a different embodiment of a method for processing spent grain into frozen dough products as described above wherein the dough products comprise pizza dough.

In yet another aspect, the invention provides the invention provides a different embodiment of a method for processing spent grain into frozen dough products as described above wherein the dough products comprise pizza dough.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
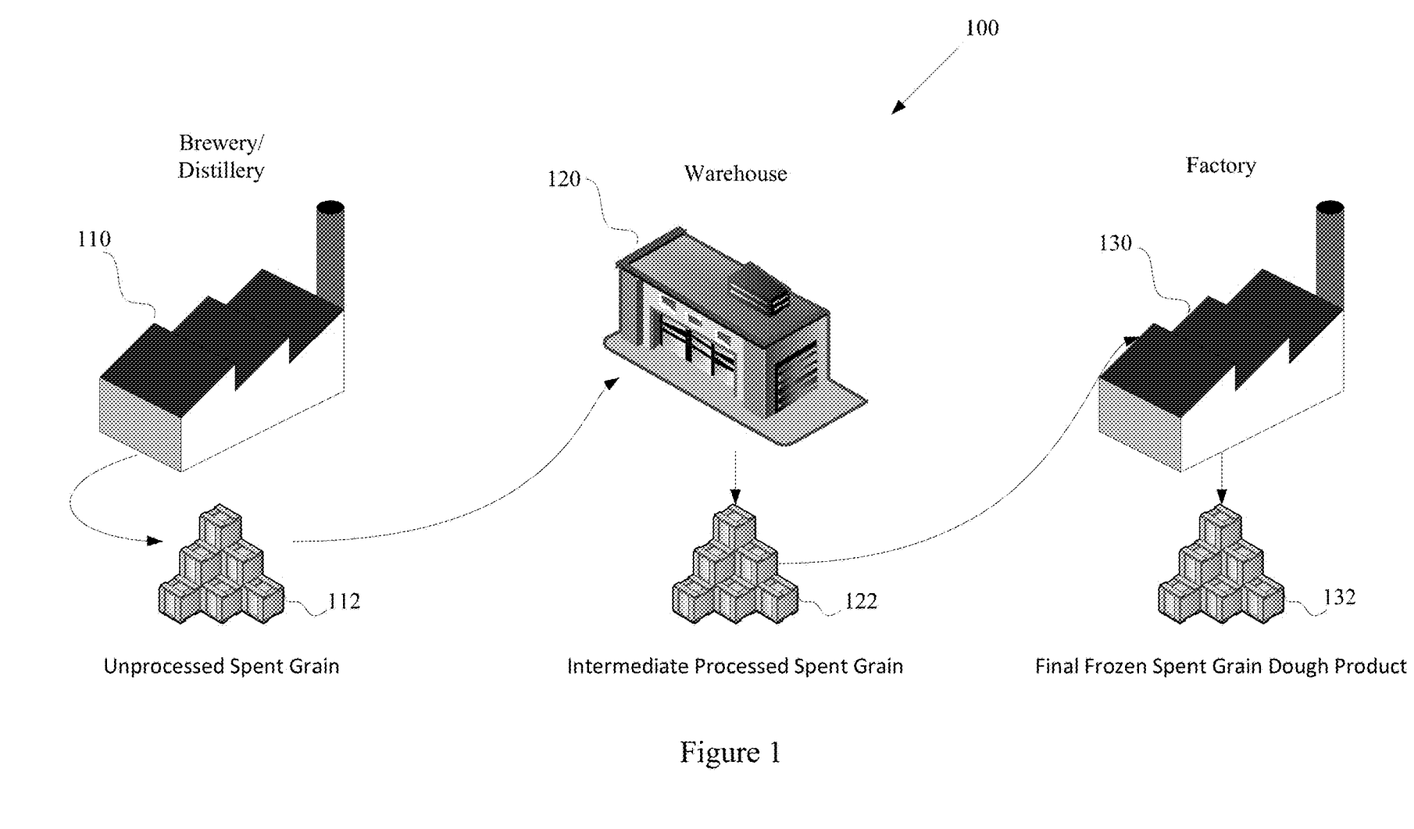
FIG. 1 is a diagram showing an overview of the spent grain dough production process for one embodiment of the invention.

FIG. 1 is a diagram showing an overview of the spent grain dough production process for one embodiment of the invention. The process 100 begins at the brewery 110. In the process of brewing beer, the brewery produces a malted grain that is used to make wort, which is a primary ingredient in brewing beer. The grain is stripped of its sugars in a process that involves running boiling water over the grain. What is left after this process is a hot, water laden, unprocessed spent grain 112. This unprocessed spent grain must be drained, cooled, and frozen before it can be used in dough production at the factory 130. The amount of spent grain produced by a brewery depends on the volume of alcohol production and may range from several hundred pounds to many tons.

The unprocessed spent grain 112 is packaged according to one of several methods at the brewery 110. In a first method, the unprocessed spent grain is put into sealed containers in a hot, wet state, but it must be cooled to 40° F. within three to four hours of being removed from the brewing process. Spent grain processed in this manner must be put in a draining and cooling container when it reaches a warehouse 120 separate from the brewery. In a second method, the unprocessed spent grain 112 is placed in a false bottom container in a hot, wet state. The container is then put into a refrigerator to cool and drain. Once the grain has drained to the desired level, the false bottom containing the liquid drained from the spent grain is removed and the container is resealed and refrigerated.

The unprocessed spent grain 112 is then sent to the warehouse 120 where it is further cooled and drained. In one embodiment the warehouse 120 is located within the brewery 110. Once the water content has reached the desired level of between 0% and 30% saturation, the spent grain is placed in storage containers and is frozen. It is important that a consistent level of saturation be reached for each batch of spent grain for production of the frozen spent grain dough product. The grain will freeze at a temperature of 32° F., but may be kept colder. The intermediate processed spent grain 122 may be kept in the warehouse for up to 6 months before being processed at the factory 130.

When the intermediate processed spent grain arrives at the factory 130, it is allowed to partially or completely thaw before being mixed in with the other ingredients that comprise the dough mixture. The spent grain is combined with dry goods such as flour, yeast, sugar, sodium bicarbonate, salt, or baking powder, and wet ingredients that may include water, milk, corn syrup, and eggs to form a dough mixture. Artificial or natural flavors and preservatives may also be added.

The dough mixture is then formed into the desired production shape such as a sheet or ball, and is then frozen. The dough sheet or ball may be either flash frozen or allowed to freeze at temperatures −30° F. and 20° F. The final frozen dough processed product 132 is then stored or packaged and prepared for distribution.

Figure 2:
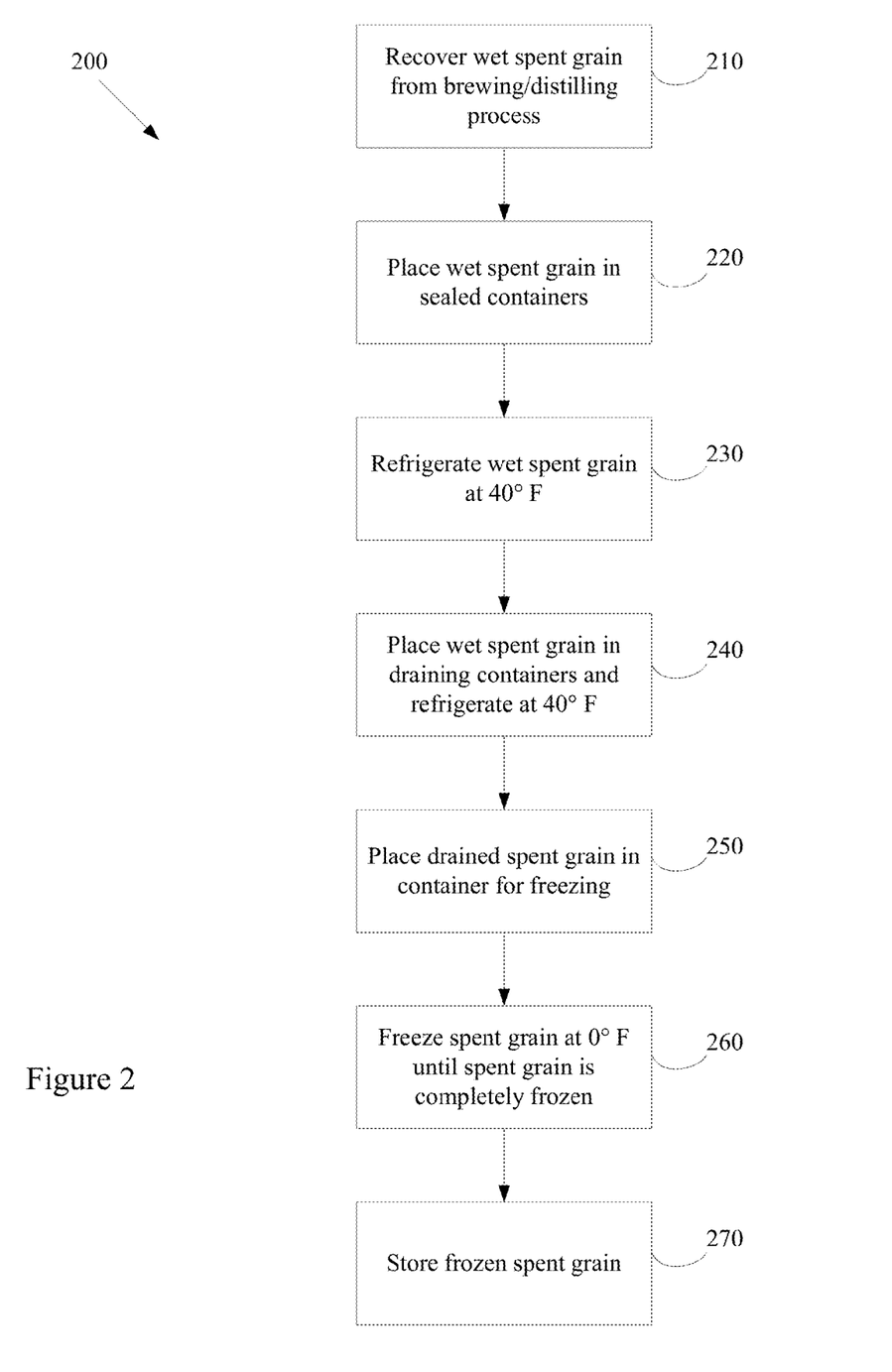
FIG. 2 is a flow chart showing an overview of the spent grain recovery and processing phases for one embodiment of the invention.

With reference now to FIG. 2. FIG. 2 provides a flowchart depicting an embodiment of the present invention. The process 200 provides a series of steps for the processing of unprocessed spent grain into intermediate processed spent grain. The process 200 begins in step 210 with recovering unprocessed spent grain from an alcohol production process such as brewing or distilling. The unprocessed spent grain is removed from the process in a hot, wet state with a moisture content in excess of 80%. The unprocessed spent grain is then placed into sealed containers for transport in step 220 in this hot, wet state. The containers used to transport the unprocessed spent grain are designed to allow for an even cooling of the spent grain while it is being transported in a refrigerated transport vehicle. Special containers are needed because if the spent grain were put into a single cylindrical or rectangular container the contents of the container would not cool evenly, leaving a warmer inner core of material. What is needed is a flatter container that would not have a large core of material, or a container with a hollow core to allow the spent gain in the container to cool evenly, inside and out. A container designed to cool the spent grain evenly is necessary otherwise the center portion of the spent grain in the container would retain a high heat level, and would not cool to the required at least 40° F.

Once the spent grain has been placed in the sealed container, it is cooled to a temperature of at least 40° F. in step 230. The entire contents of the container must reach this temperature within 3 to 4 hours to ensure that bacteria cannot grow in the spent grain. The cooled spent grain is then placed in a separate container to be dried in step 240. Throughout the drying process, the temperature of the spent grain is maintained below 40° F. and above 32° F. so that the spent grain remains cool but does not freeze. The drying process 240 can take from 2-48 hours to sufficiently reduce the moisture content to the desired level. The desired level for the moisture content in the spent grain may vary within the range of 0-25% depending on the dough recipe in which the spent grain will be used. However, a consistent moisture content is required for any recipe, and the amount of time necessary for the drying process is determined by the moisture content required by the dough recipe. Once the drying process in step 240 has reduced the moisture content of the spent grain to the desired level, the spent grain is placed in a separate container for the freezing process in step 250.

The spent grain is then frozen in the freezing process 260. The duration of the freezing process 260 will depend on the quantity and moisture content of the spent grain, and may take from 1 to 12 hours depending on these variables. In the preferred embodiment, the spent grain will be placed in an environment at between −15° F. and 0° F. until the temperature of the spent grain has been reduced to a temperature of at least 32° F. and is thoroughly frozen. Once the spent grain has been frozen, it is considered intermediate processed spent grain and is stored in a frozen state until it can be further processed into a dough product.

Figure 3:
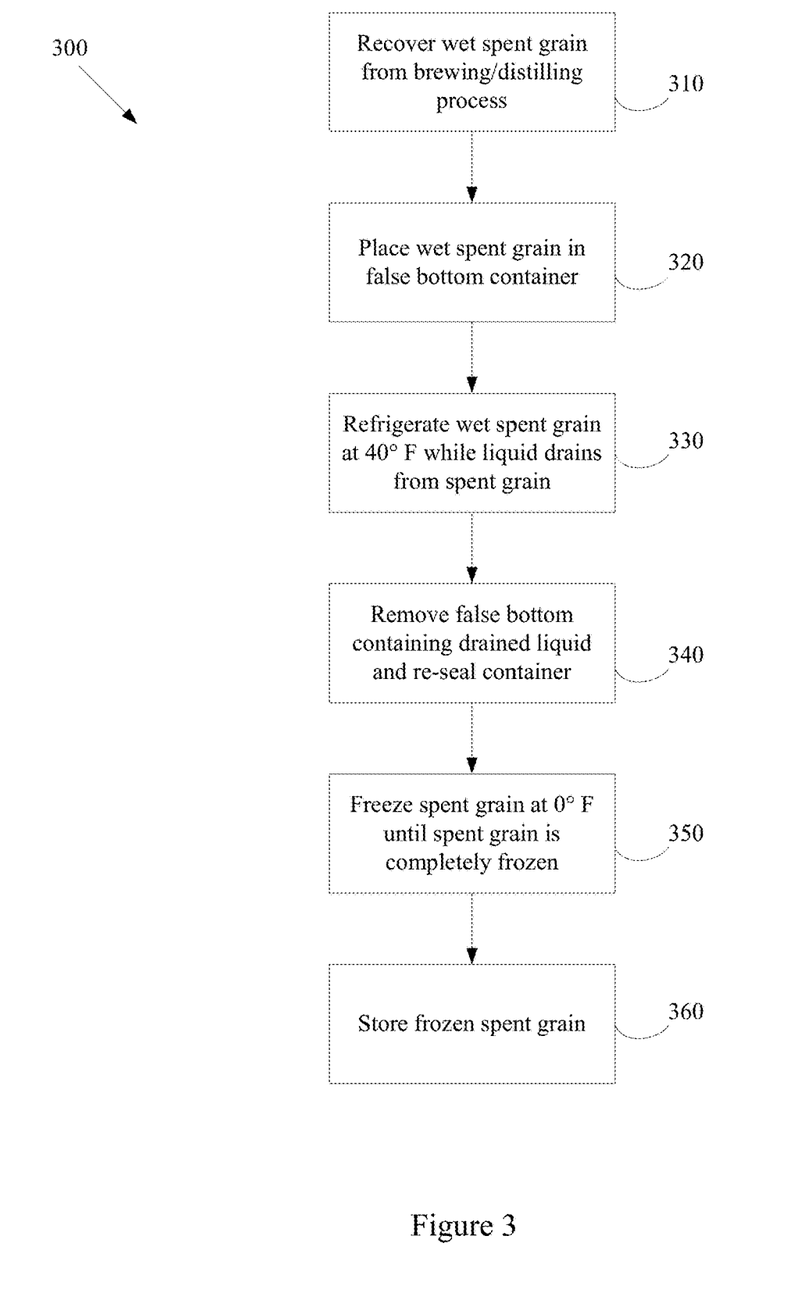
FIG. 3 is a flow chart showing an overview of an alternate embodiment of the spent grain recovery and processing phases of the invention.

With reference now to FIG. 3. Process 300 provides an alternate embodiment of the processing of unprocessed spent grain into intermediate processed spent grain. The process 300 begins in step 310 with recovering unprocessed spent grain from an alcohol production process such as brewing or distilling. The unprocessed spent grain is removed from the process in a hot, wet state with a moisture content in excess of 80%. In step 320, the unprocessed spent grain is then placed into a special container with a hollow core spacer and a false bottom compartment separated from the main compartment by a perforated panel. An example of the container can be seen in FIG. 8.

Figure 8:
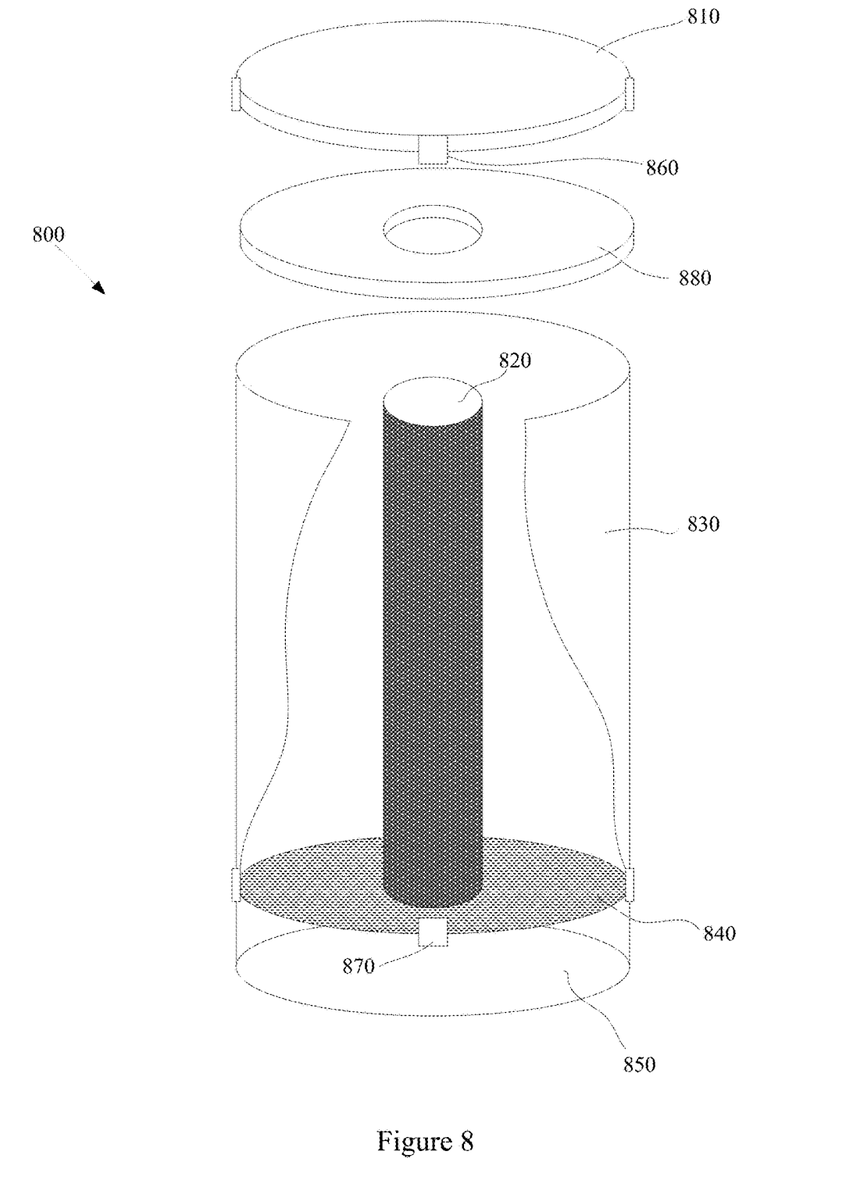
FIG. 8 is a diagram of a specially designed container used for draining and cooling spent grain.
Figure 9:
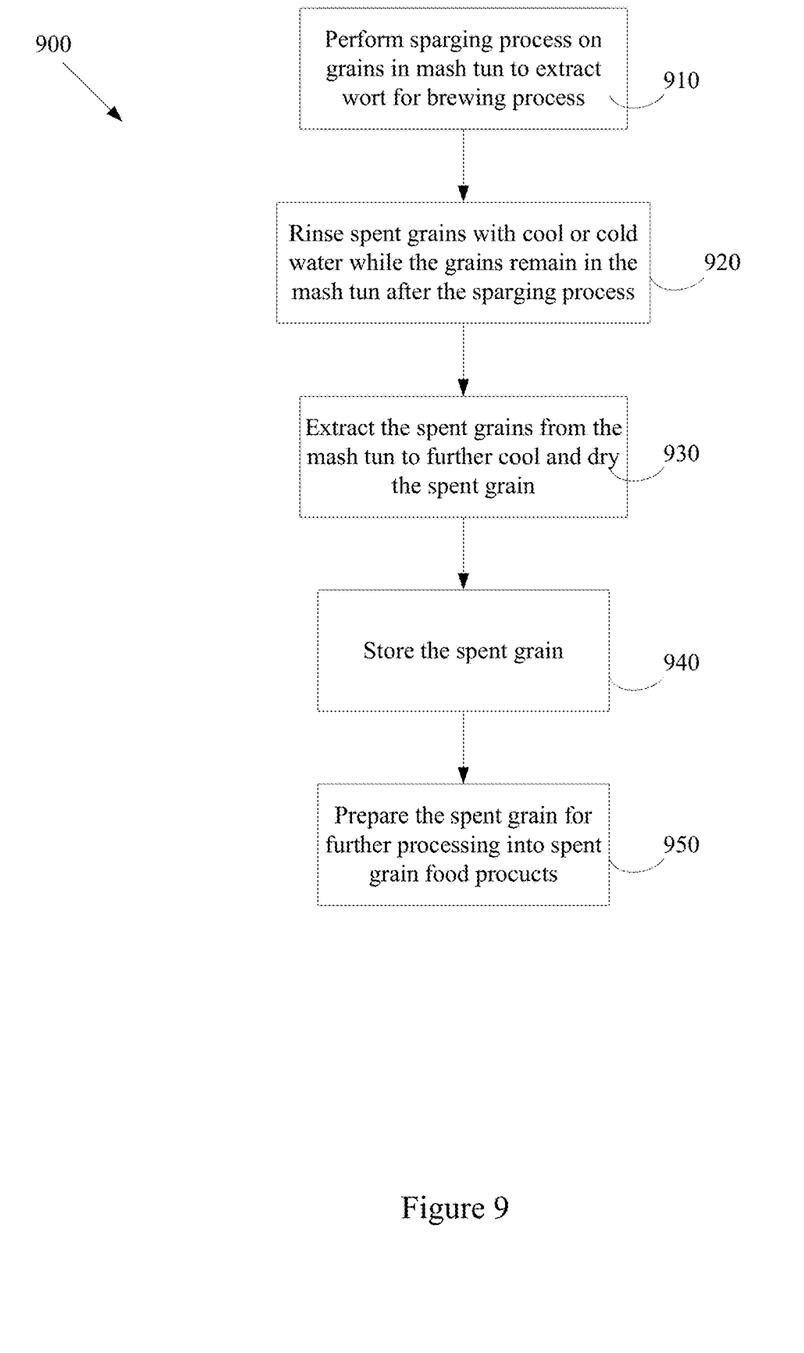
FIG. 9 is a flow chart showing an overview of a process for cooling and processing spent grain to be turned into spent grain food products for one embodiment of the invention.

The container 800 in FIG. 8 is depicted in a cylindrical configuration, but could also be configured as a rectangle or square. The outer wall 830 of the container 800 is only permanently connected to the perforated bottom plate 840. The perforations on the bottom portion can be either slits or holes, but should be smaller in size than the granularity of the spent grain being drained in the container. The size of the perforations is important because if the perforations are too large the spent grain will fall through the perforations, and if they are too small the liquid will not drain effectively from the spent grain. A false bottom 850 is attached to the container 800 via clasps 870. This allows the false bottom 850 to be removed and the drained liquid disposed of. A lid similar to the lid 810 may be fastened to the bottom of the container 800 once the false bottom 850 has been removed. The lid 810 is fastened to the top of the container 800 using clasps 860 to provide a complete seal on the container 800. However, lid 810 and false bottom 850 may also be threaded such that they can be screwed or twisted on and off. In the center of the container 800 a hollow cylinder 820 is positioned. The hollow cylinder 820 may be included to promote even and rapid cooling of the spent grain stored in the container. The hollow cylinder 820 may also be perforated to further facilitate the draining of the spent grain stored in the container. Cooling cylinder 820 is optional and may be unnecessary in the event the cooling process of FIG. 9 is used (see below). The perforated bottom plate 840 and hollow cylinder 820 allow for the simultaneous draining and cooling of any substance placed in the container 800. An optional washer plate 880 may also be placed into the container. The washer 880 would fit around the hollow cylinder 820 and would apply additional pressure on the contents of the cylinder to facilitate faster drying of the contents.

Referring back to FIG. 3. After the wet, unprocessed spent grain has been placed into the container it is refrigerated and drained in step 330. The spent grain must be reduced to a temperature of 40° F. within three to four hours to comply with food service guidelines. The duration of the refrigeration and draining of step 330 will depend on several factors. A higher initial moisture content and a lower desired end moisture content will result in a longer cooling and draining process, while a lower starting moisture content and a higher desired end moisture content will result in a shorter cooling and draining process. At the end of the refrigeration and draining process 330 the false bottom containing the drained liquid is removed from the container and the container is re-sealed. The liquid drained from the spent grain is disposed of and not used in the rest of the process. After the container containing the drained spent grain has been re-sealed, it is placed in freezer in step 350 at between −15° F. and 0° F. until the grain is thoroughly frozen. The intermediate processed spent grain is then stored in step 360 in the frozen state until it can be further processed.

Figure 4:
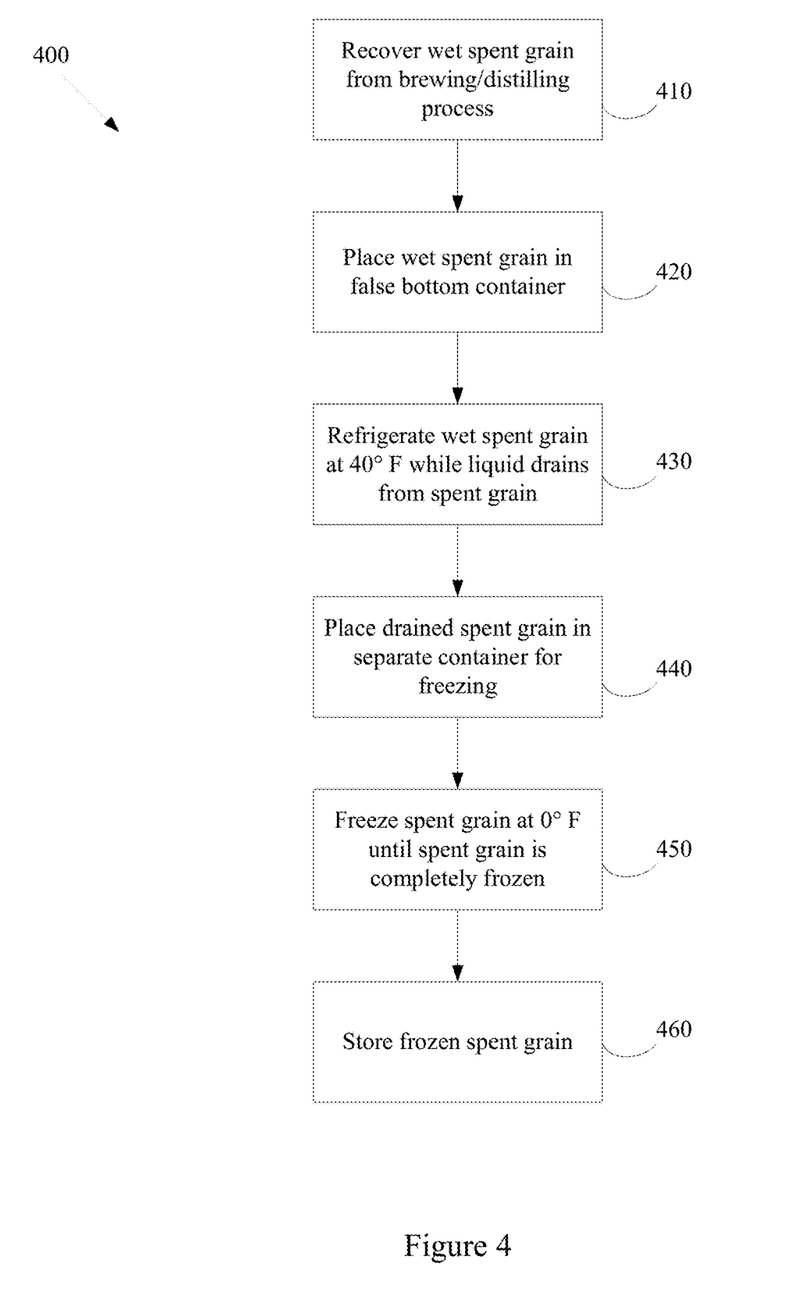
FIG. 4 is a flow chart showing an overview of an alternate embodiment of the spent grain recovery and processing phases of the invention.

With reference now to FIG. 4. Process 400 provides an alternate embodiment of the processing of unprocessed spent grain into intermediate processed spent grain. The process 400 begins in step 410 with recovering unprocessed spent grain from an alcohol production process such as brewing or distilling. The unprocessed spent grain is removed from the process in a hot, wet state with a moisture content in excess of 80%. In step 420, the unprocessed spent grain is then placed into a special container with a hollow core spacer and a false bottom compartment separated from the main compartment by a perforated panel. An example of the container can be seen in FIG. 8.

After the wet, unprocessed spent grain has been placed into the container it is refrigerated and drained in step 430. The spent grain must be reduced to a temperature of 40° F.within three to four hours to comply with food service guidelines. The duration of the refrigeration and draining of step 430 will depend on several factors. A higher initial moisture content and a lower desired end moisture content will result in a longer cooling and draining process, while a lower starting moisture content and a higher desired end moisture content will result in a shorter cooling and draining process. At the end of the refrigeration and draining process 430 the spent grain is removed from the draining container and placed in a separate container in step 440 for the freezing process 450. In one embodiment the separate container would be a low, flattened cylinder. In another embodiment the container would be a large, flattened a rectangular box. In yet another embodiment the container would be a sealed, flexible bag. Once the spent grain has been transferred from the draining container to the freezing container it is placed in freezer in step 450 at between −15° F. and 0° F. until the grain is thoroughly frozen. The intermediate processed spent grain is then stored in step 460 in the frozen state until it can be further processed.

Figure 5:
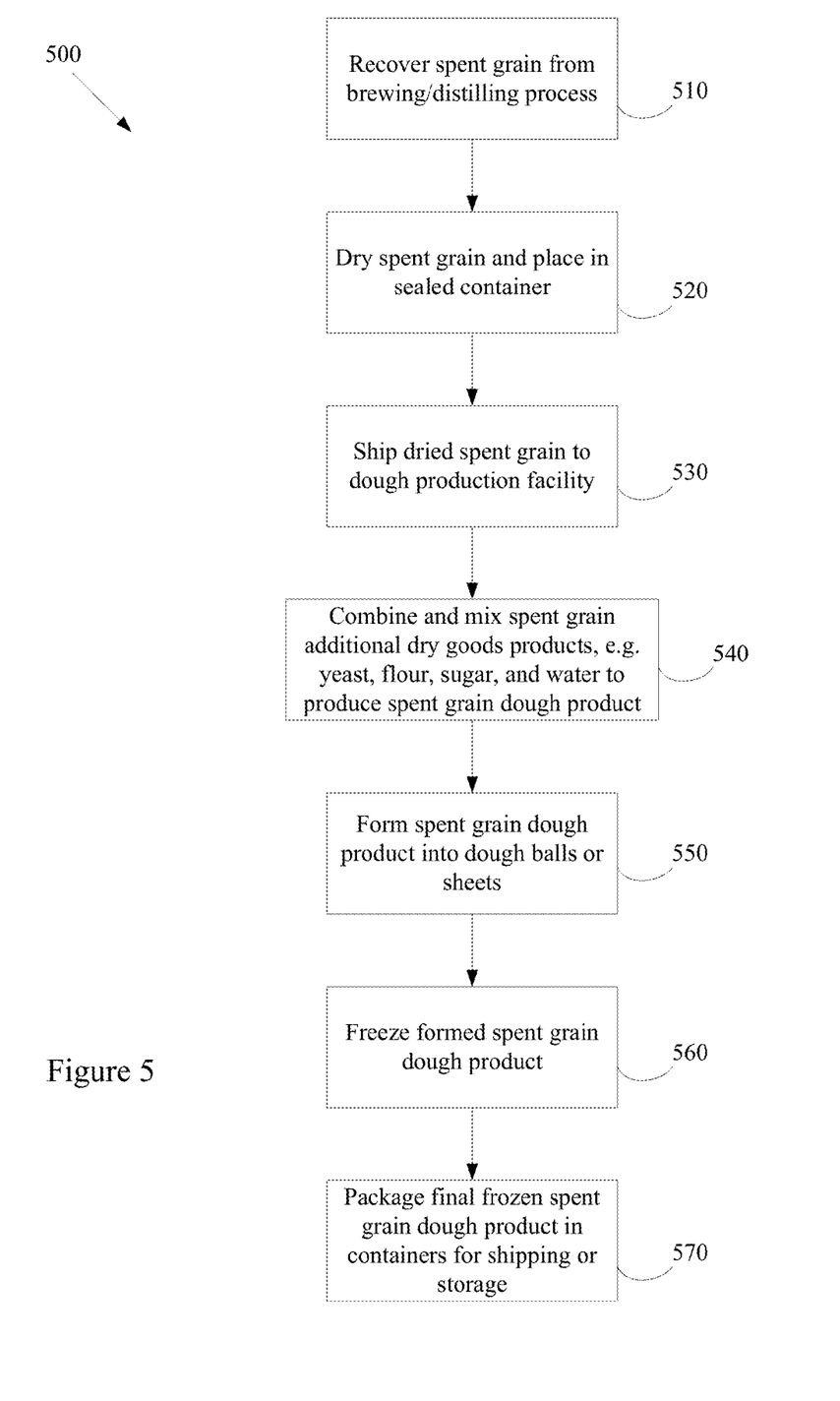
FIG. 5 is a flow chart showing an overview of an embodiment of the spent grain recovery, drying, processing, and dough product production phases of the invention

Referring now to FIG. 5. The process 500 provides an embodiment of the present invention for rapidly processing spent grain into a final frozen spent grain dough product. The process 500 begins in step 510 wherein spent grain is recovered from a brewing or alcohol distillation process. The spent grain recovered in step 510 is then dried in step 520 and placed into a sealed container. The drying step 520 can be completed in one of three ways as depicted in FIG. 5a.

Figure 5A:
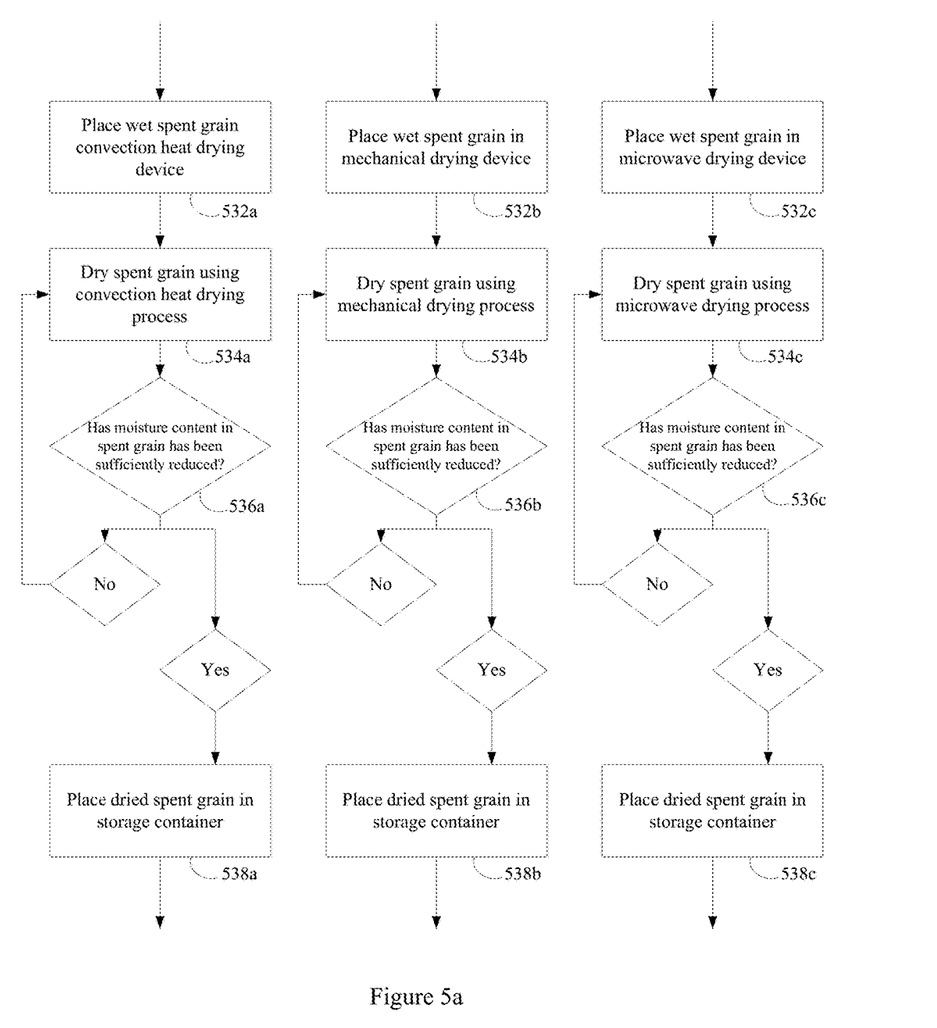
FIG. 5a is a flow chart depicting three different methods of performing the drying phase of the invention

The process in FIG. 5a beginning with step 532a describes a drying process whereby heat, such as from a furnace, is used to dry the spent grain. In step 532a the wet spent grain is placed in a convection heat drying device, such as a tumble dryer heated with a natural gas burner. The spent grain is dried in step 534a using the convection heat drying process. The moisture content of the spent grain is then determined in step 536a. If the moisture content has been reduced to the desired level, the spent grain is placed in a storage container in step 538a and the container is sealed. If the spent grain has not been sufficiently dried, the steps 534a and 536a are repeated until the moisture content of the spent grain has been sufficiently reduced.

The process in FIG. 5a beginning with step 532b describes a drying process whereby the spent grain is dried using a mechanical process. A mechanical process could be a process such as drying by belt press, screw press, direct press, or any other method for mechanically removing liquids from the spent grain. The spent grain is subjected to the mechanical drying process in step 534b. The moisture content of the spent grain is then determined in step 536b. If the moisture content has been reduced to the desired level, the spent grain is placed in a storage container in step 538b and the container is sealed. If the spent grain has not been sufficiently dried, the steps 534b and 536b are repeated until the moisture content of the spent grain has been sufficiently reduced.

The process in FIG. 5a beginning with step 532c describes a drying process whereby the spent grain is dried using a microwave heating process. A microwave heating process is one that subjects the spent grain to microwaves to heat the spent grain to facilitate the reduction of the moisture content in the spent grain. The spent grain is subjected to the microwave process in step 534c. The moisture content of the spent grain is then determined in step 536c. If the moisture content has been reduced to the desired level, the spent grain is placed in a storage container in step 538c and the container is sealed. If the spent grain has not been sufficiently dried, the steps 534c and 536c are repeated until the moisture content of the spent grain has been sufficiently reduced.

Referring now back to FIG. 5, once the drying process of step 520 has been completed and the spent grain has been placed in storage containers, the dried spent grain is shipped to a dough production facility in step 530. At the dough production facility, the dried spent grain is combined with additional dry goods products and water to form a dough mixture in step 540. The dry goods used may include flour, salt, sugar, yeast, or a leavening agent. In a preferred embodiment, the specific dough mixture produced by combining the spent grain, the additional dry goods, and the water would be a spent grain pizza dough mixture. The dough mixture produced in step 540 is then formed into dough balls or dough sheets in step 550 depending on the desired end use of the spent grain dough product. In a preferred embodiment, the spent grain dough product would be formed into dough ball shapes that could easily be formed into pizza crusts. Once the spent grain dough product has been formed into the desired shape in step 550 it is frozen in step 560. The freezing step 560 can be either a freezing process wherein the spent grain dough product is placed in a freezer at between −15° F. and 0° F. until the grain is thoroughly frozen, or it can be a flash freezing process wherein the spent grain dough product is subjected to cryogenic temperatures to rapidly freeze the spent grain dough product. Once the spent grain dough product has been frozen in step 560 it is then packaged and stored for shipping or further processing in step 570.

Figure 6:
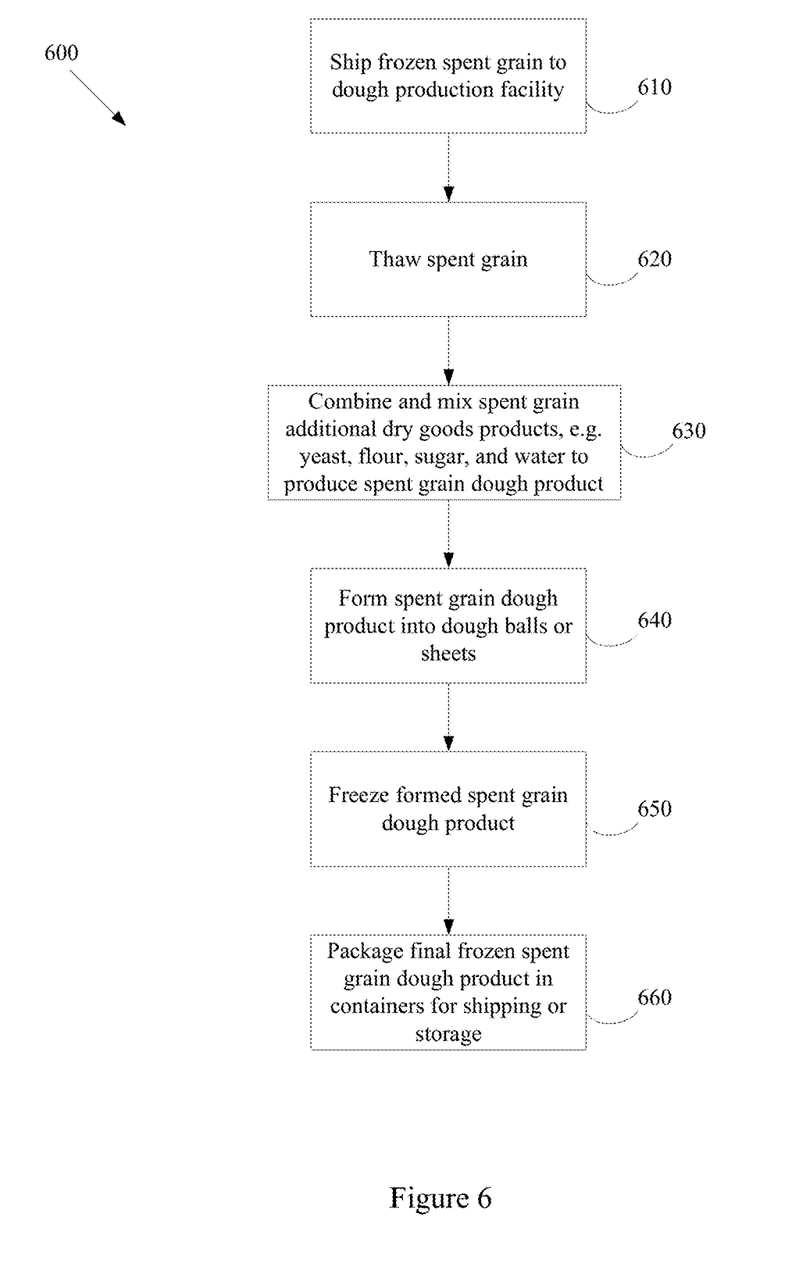
FIG. 6 is a flow chart showing an overview of the dough production process for one embodiment of the invention.

With reference now to FIG. 6, the process 600 in FIG. 6 depicts an embodiment of the process wherein the intermediate process spent grain produced in FIGS. 2, 3, and 4 is further processed into a final frozen spent grain dough product. The process begins in step 610 when the frozen spent grain arrives at the dough production facility. The spent grain is then thawed or partially thawed in step 620. The thawed spent grain is then combined with additional dry goods products and water to form a dough mixture in step 630. The dry goods used may include flour, salt, sugar, yeast, or a leavening agent. The dough mixture produced in step 630 is then formed into dough balls or dough sheets in step 640 depending on the desired end use of the spent grain dough product. Once the spent grain dough product has been formed into the desired shape in step 640 it is frozen in step 650. The freezing step 650 can be either a freezing process wherein the spent grain dough product is placed in a freezer at between −15° F. and 0° F. until the grain is thoroughly frozen, or it can be a flash freezing process wherein the spent grain dough product is subjected to cryogenic temperatures to rapidly freeze the spent grain dough product. Once the spent grain dough product has been frozen in step 650 it is then packaged and stored for shipping or further processing in step 660.

Figure 7:
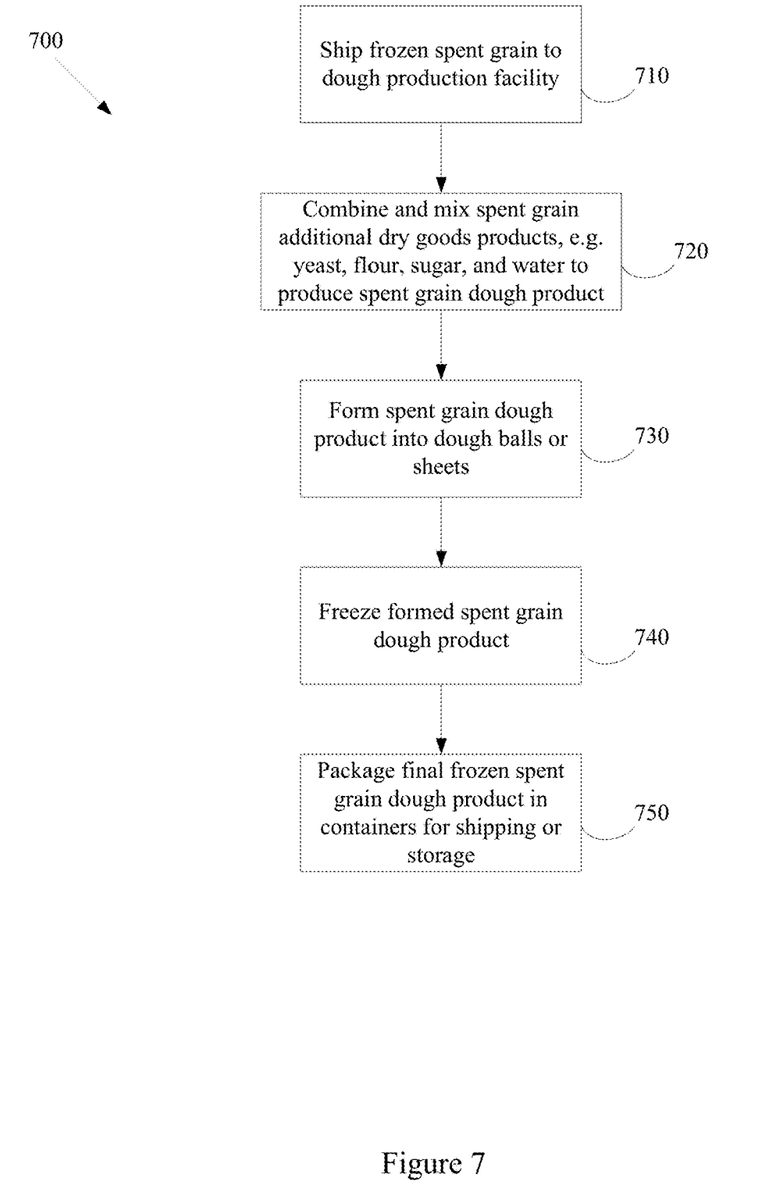
FIG. 7 is a flow chart showing an overview of an alternate embodiment the dough production process for one embodiment of the invention.

With reference now to FIG. 7, the process 700 in FIG. 7 depicts an embodiment of the process wherein the intermediate process spent grain produced in FIGS. 2, 3, and 4 is further processed into a final frozen spent grain dough product. The process begins in step 710 when the frozen spent grain arrives at the dough production facility. The frozen spent grain is then combined with additional dry goods products and water to form a dough mixture in step 720. The dry goods used may include flour, salt, sugar, yeast, or a leavening agent. The dough mixture produced in step 720 is then formed into dough balls or dough sheets in step 730 depending on the desired end use of the spent grain dough product. Once the spent grain dough product has been formed into the desired shape in step 730 it is frozen in step 740. The freezing step 740 can be either a freezing process wherein the spent grain dough product is placed in a freezer at between −15° F. and 0° F. until the grain is thoroughly frozen, or it can be a flash freezing process wherein the spent grain dough product is subjected to cryogenic temperatures to rapidly freeze the spent grain dough product. Once the spent grain dough product has been frozen in step 740 it is then packaged and stored for shipping or further processing in step 750.

In one embodiment, 1,600 pounds of processed spent grain is combined with water and a dry goods mixture consisting of yeast, flour, salt, and sugar to produce 14,392, 16 oz. frozen spent grain dough balls. The number and size of the dough balls produced depends on the water content of the processed spent grain, the dry goods mixture, and customer specification for dough ball size.

With reference now to FIG. 9, the process 900 depicts an embodiment of a process whereby malted grain mash used in the sparging process to produce wort for brewing beer is cooled prior to extraction from a mash tun. First, in the step 910 the malted grain is placed in a mash tun and washed with hot (e.g., 170° F.) water to extract the sugars from the grain and produces a mash grain product. The liquid that is extracted from the grain is called wort. This wort is drained out of the bottom of the mash tun container. The wort may be re-washed or filtered over the grain to further extract more sugars or to increase the clarity and decrease the particulate content of the wort. After the sparging process is complete and the wort has been extracted for use in the production of alcoholic beverages, in step 920 the spent grains are washed or rinsed with cool or cold water (e.g., water below 70° F.). Preferably the water will be at or below 40° F. but even using tap or source water having a temperature lower than the mash grain product will have the effect of lowering the temperature of the spent grain product. At or below 40° F. is the preferred condition for preserving and storing the spent grain for later use in making food products, such as dough for pizza and other food products.

Depending on the effectiveness of this pre-cooling process, additional cooling may be needed to bring the spent grain product down to the desired temperature of at or below 40° F. The rinsing may be performed by the same sparg arm that sprays hot water over the grains in the sparging process. The cool rinsing water is drained out of the bottom of the mash tun and is disposed of This rinsing and cooling step is not normally performed on spent grain and is primarily necessary for preparing spent grain for use in spent grain food products. The rinsing process does not dilute or diminish the taste or flavor of the spent grain. After the spent grains have been rinsed and cooled, they are extracted from the mash tun in step 930. The rinsed and cooled spent grains are then stored in step 940. The rinsed and cooled spent grains may also be further cooled or dried before the storage step, and the storage step 940 may further comprise freezing or refrigerating the spent grains. The stored spent grains are then removed from storage in step 950 and may be further processed before being used to produce spent grain food products.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method for producing spent grain dough products comprising:
   a. containing spent grain yielded from an alcoholic beverage production process;
   b. draining the spent grain;
   c. cooling the spent grain during the draining process by bringing the spent grain into thermal conductive contact with a liquid, the liquid being at a temperature substantially below the spent grain temperature;
   d. freezing the spent grain after the draining and cooling process has been completed;
   e. combining the spent grain with a composition of dry goods and at least one solvent to form a dough mixture; and
   f. freezing the dough mixture.

2. The method of claim 1 wherein the spent grain is cooled to a temperature between 40° F. and 34° F. during the draining process.

3. The method of claim 1 wherein freezing the dough mixture comprises flash freezing.

4. The method of claim 1 wherein the composition of dry goods comprises at least yeast, flour, and sugar.

5. The method of claim 1 wherein the at least one solvent is water.

6. The method of claim 1 wherein the dough mixture is formed into a shape selected from the group consisting of dough balls and dough sheets.

7. The method of claim 1 wherein the spent grain is comprised of a grain selected from the group consisting of wheat, barley, rye, corn, millet, and sorghum.

8. The method of claim 1 wherein the dough mixture is pizza dough.

9. A method for producing spent grain products comprising:
   a. containing spent grain yielded from an alcoholic beverage production process, the spent grain being at an initial temperature of greater than 100 degrees Fahrenheit;
   b. bringing the spent grain into thermal conductive contact with a liquid, the liquid being at a temperature substantially below the spent grain initial temperature, thereby reducing the temperature of the spent grain to an intermediate temperature lower than the initial temperature;
   c. draining the spent grain;
   d. freezing the spent grain;
   e. combining the spent grain with a composition of dry goods and at least one solvent to form a dough mixture; and
   f. freezing the dough mixture.

10. The method of claim 9 wherein the contained spent grain is at least partially drained prior to bringing the spent grain into thermal conductive contact with a liquid.

11. The method of claim 9 wherein the contained spent grain is dried using a process selected from the group consisting of convection drying, furnace drying, oven drying, mechanical drying, heated tumble drying and microwave drying.

12. The method of claim 9 wherein freezing the dough mixture comprises flash freezing.

13. The method of claim 9 wherein the composition of dry goods comprises at least yeast, flour, and sugar.

14. The method of claim 9 wherein the at least one solvent is water.

15. The method of claim 9 wherein the dough mixture is formed into a shape selected from the group consisting of dough balls and dough sheets.

16. The method of claim 9 wherein the spent grain is comprised of a grain selected from the group consisting of wheat, barley, rye, corn, millet, and sorghum.

17. The method of claim 9 wherein the dough mixture is pizza dough.

* * * * *